United States Patent [19]
van Deelen

[11] 3,744,910
[45] July 10, 1973

[54] APPARATUS FOR OPTICAL INVESTIGATIONS AND MEASUREMENTS WITH THE AID OF SEVERAL COHERENT LIGHT BEAMS

[75] Inventor: Wim van Deelen, Maassluis, Netherlands

[73] Assignee: Nederlandse Organisatie Voor Toegepastnatuurwetenschappelijk Onderzoek Ten Behoeve Van Nijverheid, Handel En Verkeer, The Hague, Netherlands

[22] Filed: June 11, 1971

[21] Appl. No.: 152,102

[52] U.S. Cl. .................. 356/106, 356/111, 356/4
[51] Int. Cl. ..................... G01b 9/02, G01c 3/08
[58] Field of Search ................. 356/106, 111, 28, 356/4; 350/162 R

[56] References Cited
UNITED STATES PATENTS
| | | | |
|---|---|---|---|
| 3,419,330 | 12/1968 | Schneider | 356/106 |
| 3,649,125 | 3/1972 | Lehmann | 356/106 |
| 2,745,310 | 5/1956 | Horn | 356/111 |
| 3,507,564 | 4/1970 | Franks | 356/106 |

OTHER PUBLICATIONS

"Measurement of Turbulent Velocities . . . light"; Joural of Sci. Inst. 1 727, 1968.

*Primary Examiner*—Ronald L. Wibert
*Assistant Examiner*—Conrad Clark
*Attorney*—Hammond & Littell

[57] ABSTRACT

In an apparatus for optical investigations and measurements in which a laser and a beam splitter produce coherent beams of monochromatic light, the beam splitter is a hologram that is a photographic reproduction of the intersection of corresponding coherent beams of monochromatic light. The superposition of a plurality of such holograms in different positions results in a multiple beam splitter that provides a plurality of coherent beams. These beams are used for the three-dimensional determination of the speed of a moving effluvium and for the elimination of noise in the output signals.

4 Claims, 4 Drawing Figures

Patented July 10, 1973
3,744,910
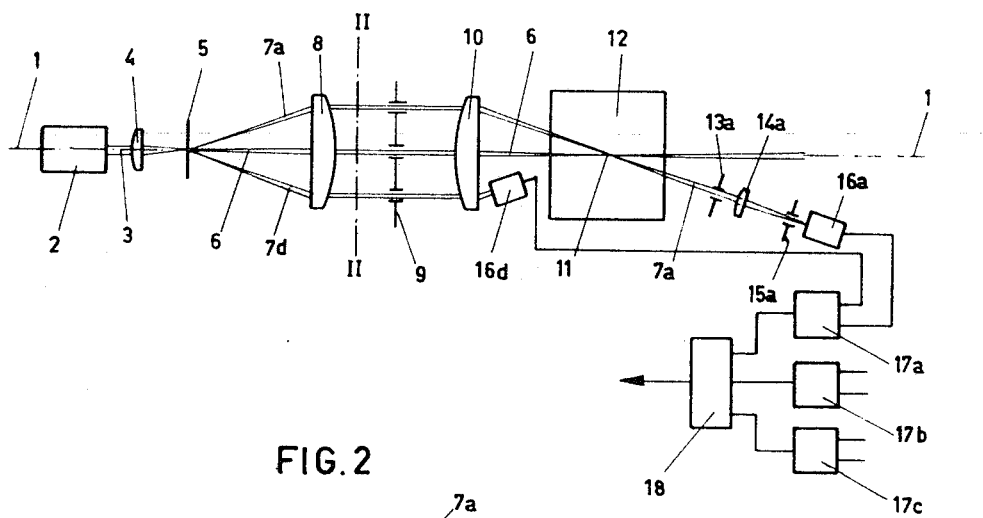
FIG. 1
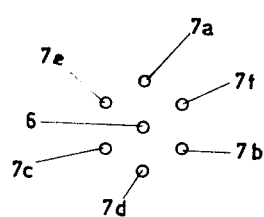
FIG. 2
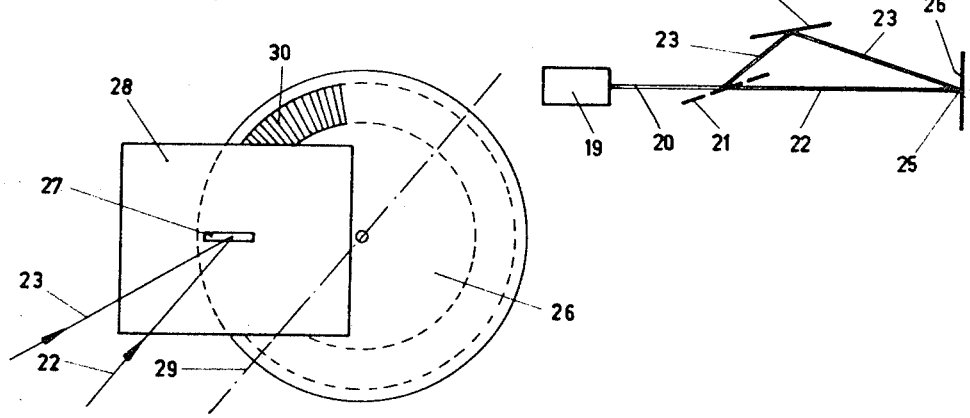
FIG. 4
FIG. 3
INVENTOR.
WIM VAN DEELEN
BY
ATTORNEYS

APPARATUS FOR OPTICAL INVESTIGATIONS AND MEASUREMENTS WITH THE AID OF SEVERAL COHERENT LIGHT BEAMS

The invention relates to an apparatus for carrying out optical investigations and measurements with the aid of two or more monochromatic coherent light beams, which for this purpose is provided with a light source for the production of a monochromatic light beam, and a beam splitter.

In the apparatuses of this kind known in the art the monochromatic light beam, for which usually a laser is applied, is, with the aid of a mirror that is partly transmittable, divided into a transmitted and a split part. The two beams or parts of them obtained in this way are reunited along different paths and in doing so the differences being found or the phenomena occurring supply information about the circumstances alongside the two paths or on the location of coincidence.

In order to meet the need for more than two coherent light beams that sometimes arises an apparatus of the type known in the art, but then equipped with several transmitting mirrors that each split off a part of the original light beam, can be considered. In order to reunite in such an apparatus all light beams in one point, for each of them a mirror, a prism or a system of several of such elements must be provided.

In designing, executing and using such an apparatus it will be found, however, that the unavoidable large dimensions and the complexity of the arrangement as well as the obtainment and the maintenance of the required exact adjustment of the mirrors and the like in relation to each other and in relation to the light source present great problems.

It is the object of the invention to overcome the drawbacks described of the apparatuses known in the art by providing an apparatus for optical investigations and measurements, which by means of devices that require little room and few optical elements makes two or more coherent light beams available.

For this purpose the apparatus according to the invention is characterized in that the beam splitter is a hologram of the point of intersection of the two or more coherent light beams that are produced by a light source of the kind applied in the apparatus.

The hologram, which is a photograph of the light beams in their point of intersection and consequently contains a picture of the interference occurring in the point of intersection, has the property of converting if placed, in one of the original light beams of the same wave length, this light beam into inter alia a reproduction of the original light beams that intersect each other.

Therefore, such holograms are able to replace the beam splitters that are customary for splitting beams of parallel or intersecting rays and are equipped with partly transmitting mirrors. Moreover, they have the advantage that with one hologram also more than two coherent light beams can be obtained, which means a considerable simplification of the apparatus.

Besides, the beams all diverge from one point, so that one single converging lens already is sufficient to recombine the beams elsewhere in a common point of intersection, such as is required or desired in most applications of the apparatus.

Another objection against the application of a hologram for multiple splitting of a light beam still is that for the obtainment of this hologram the same multiple and therefore extensive and interference-sensitive array of optical elements is required as was already indicated above in view of the apparatuses known in the art.

In order to eliminate this objection the apparatus according to the invention is further characterized in that the hologram is assembled into a multiple hologram from several holograms from the intersection of two coherent light beams that are superposed in different positions.

As has been found, a hologram obtained by taking two or more photos across each other every time of the same point of intersection of two coherent light beams, but every time placing the photographic material in a different position in relation to the two light beams, can equally well be used as a hologram that would be obtained as a single shot of the point of intersection of the corresponding number of light beams in the corresponding positions. This opens up the possibility for optical apparatuses that operate with larger numbers of coherent light beams, without the need for an extensive optical arrangement for composing the beam splitter required for it.

In a preferential embodiment the apparatus according to the invention is further characterized in that the holograms from which the multiple hologram is combined, are identical and are superposed in positions in which they are rotated in relation to each other around the axis of one of the two coherent light beams.

With such an apparatus a number of coherent light beams are available, one of which occupies a central position and the others are grouped as a cone around the central light beam, and it has been found that by means of them advantageous measuring arrangements can be realized.

The invention is further elucidated below with reference to the drawing. This shows schematically in FIG. 1 : an apparatus according to the invention for three-dimensional measurements of effluvium movements;

FIG. 2 : a cross-section according plane II—II perpendicular to the optical axis in FIG. 1;

FIG. 3 : an arrangement with the aid of which the beam splitter of the apparatus according to FIG. 1 can be obtained;

FIG. 4 : an arrangement with the aid of which a particular beam splitter is obtained.

At the fore part of optical axis 1 of the apparatus there is laser 2, which radiates beam 3 of parallel, monochromatic light. Light beam 3 is focussed by lens 4 on to beam splitter 5 and transformed by the latter into central light beam 6, which propagates along axis 1 of the apparatus, and the six light beams $7a$ to $7f$ inclusive, coherent with beam 6, which deviate from central light beam 6, under equal angles and are arranged in a regular distribution around central light beam 6. FIG. 2 shows the mutual position of beams 6 and $7a$–$f$ in a cross-section perpendicular to optical axis 1 according to line II—II in FIG. 1.

Beam splitter 5 is a hologram that contains the interference pattern of coherent light beams that intersect according to light beams 6 and $7a$–$f$ and that due to this is able of reproducing these light beams from light beam 3. The way in which the hologram of beam splitter 5 can be obtained, will be further elucidated hereinafter.

Light beams 6 and $7a$–$f$ successively pass lens 8, which has a focal point on the location of beam splitter 5 and bends beams 7a–f into the direction of axis 1, diaphragm 9, which stops scattered light and lens 10, which focusses and reunites light beams 6 and 7a–f in common point of intersection 11.

This point 11 at the same time is the measuring point of the apparatus and therefore is situated within room 12, whose walls are at least partially transparant and in which the effluvium moves with the velocity to be measured. Room 12 can, dependent on the nature of the measurement, have all sorts of shapes and in some cases can be so large that the whole apparatus can be placed within it.

After measuring point 11 light beam 7a passes diaphragm 13a, lens 14a and diaphragm 15a and finally reaches detector 16a.

Lightscattering particles carried by the effluvium and which, if the effluvium is clear, are added to it, such as for instance smoke is brought into a stream of gas, scatter a part of the light of beams 6 and 7a–f. Of the light of beam 6 scattered in point 11 a part is incident on detector 16a simultaneously with beam 7a. Because this light does not originate from beam 6 directly, however, but has been scattered by particles moving with the velocity of the effluvium, it has been subjected to a change in frequency as a result of the Doppler effect. Detector 16a perceives this Doppler frequency as the beat frequency of beam 7a and the scattered light from beam 6 coherent with it. This frequency is dependent on the condition of movement of the effluvium on the location of measuring point 11 that is proportional with the velocity component in the direction of the obtuse bisector of the angle between beams 6 and 7a. Consequently the output signal of detector 16a is a direct measure for this velocity component.

Not only the interference but also the noise in light beam 7 that originates from light source 2 is converted into an output signal by detector 16a. Dependent on the type of light source and the nature of the measurement it may be desirable or necessary to suppress the noise. In such events in light beam 7d situated diametrically opposite to light beam 7a detector 16d is arranged before measuring room 12 and the output signals of the two detectors 16a and 16d, which contain the same noise, are supplied to differential amplifier 17a, which removes at least the greatest noise components from the signal.

Quite similarly the detectors of light beams 7b and 7c produce signals relating to two other velocity components of the effluvium movement by interference of beams 7b and 7c with light from beam 6 scattered in their direction, if necessary for the suppression of the noise in co-operation with the detectors of light beams 7e, 7f respectively and copensators 17b, 17c respectively.

The three signals thus obtained enable a spatial determination of the effluvium movement, however, whereas the velocity components measured are not perpendicular to each other, the apparatus is provided with a transformation-circuit or calculating device 18, which converts the three signals into more efficiently usable data of three mutually perpendicular velocity components.

For those cases in which only the velocity in a certain plane needs to be measured, hologram 5 can be made such that two components of the velocity are measured that are perpendicular to each other and the transformation device can be dispensed with.

The holgram that acts as beam splitter in the apparatus described above with reference to FIG. 1, can be obtained with the aid of an optical arrangement of which FIG. 3 shows the diagram.

Laser 19 is of the same type as laser 2 in the apparatus according to FIG. 1, so that emerging light beam 2o consists of the same monochromatic light as beam 3. In light beam 20 partially transmitting mirror 21 is placed. The latter splits light beam 20 into light beam 22, which passes through and light beam 23, which diverges. The latter is reflected once again by mirror 24 and as a result of this intersects light beam 22 in point 25.

In point of intersection 25 of light beams 22 and 23 photographic film 26 is placed perpendicular to the axis of beam 22 and on it a picture of the interference pattern, which results from the coincidence of coherent light beams 22 and 23, is recorded. Then, photographic film 26 is rotated 120° in its plane around point 25 and again a picture is recorded of the interference pattern, i.e. superposed upon the first one. This procedure is repeated once more, resulting in a threefold photo of point of intersection 25, light beam 22 always occupying the same position and light beam 23 every time a different position in relation to film 26.

Each of these photos yields a hologram with the property of splitting a light beam of the same light as beam 20, such as beam 3, into the passing beam 6 and two diverging beams 7a and 7d, 7b and 7e respectively, 7c and 7f respectively, lying opposite to each other in relation to beam 6. As a result of this the photos together yield the hologram that splits beam 3 into central beam 6 and beams 7a–f that diverge as a cone.

When measuring a stream velocity component with the aid of coherent light beams obtained either with a hologram or with a partly transmitting mirror, the beat frequency perceived by the detector is only a measure for the absolute value of the velocity component; two opposite, equally great velocity components each yield the same beat frequency and the same detector signal.

In many cases this is no objection because the polarity of the velocity component is fixed beforehand. Sometimes it is necessary, however, to determine the polarity, too. A method for this consists in causing a fixed shift in frequency in one of the two beams. The shift in frequency is perceived by the detector as a beat frequency, which increases in the event of a velocity component in the one direction and decreases in the event of one in the opposite direction.

For the obtainment of a pre-adjusted shift in frequency a rapidly rotating screen of lines is used in one of the light beams; the frequency with which the lines pass through the beam, is at the same time the shift in frequency.

At the described use of a hologram as a beam splitter the interference lines present in the hologram can serve for the obtainment of the shift in frequency, provided the orientation of the lines when passing the beam is always the same. This requires a hologram composed in a special way, the manufacture of which is explained with reference to FIG. 4.

Coherent light beams 22 and 23, which are obtained with the aid of the arrangement according to FIG. 3 and which intersect on photographic film 26, pass through narrow gap 27 of screen 28, which is placed directly in front of film 26, so that only a small part of film 26 corresponding with gap 27 is exposed to beams 22 and 23. Film 26, which is mounted rotatable around shaft 29, is then rotated over an angle that corresponds with the width of gap 27, and in an adjoining section exposed to beams 22 and 23. This is repeated until entire ring 30 of film 26 has been exposed in adjoining sections.

By placing the hologram thus obtained as beam splitter 5 in the arrangement according to FIG. 1 so that light beam 3 passes through annular section 30, and bringing the hologram into a rapid rotation around its axis 29, the desired shift in frequency in split-off light beams 7a–f is produced. Beam 6 is not subjected to this shift in frequency, because it is not formed by the hologram, but is a part of beam 3 that passes through.

I claim:

1. An apparatus for the optical determination of the velocity of an effluvium with light-scattering properties or components comprising a first light source producing a monochromatic light beam, a beam splitter splitting said monochromatic light beam into a first two or more divergent light beams, means to cause said divergent light beams to converge at a point of convergence, transparent means to conduct a moving effluvium with light-scattering properties or components past said point of convergence, and means in the axis of at least one of said light beams beyond said point of convergence to detect interference frequencies in light received from said point of convergence, said beam splitter being a multiple hologram of a planar superposition in differenct positions of at least two holograms on one photographic film, each hologram being a reproduction of the point of intersection of a second two or more coherent light beams produced by a second light source similar to the said first light source, said planar superposition in different positions of said at least two holograms being positions relatively rotated around the axis of one of said second two or more coherent light beams.

2. An apparatus according to claim 1 wherein said multiple holographic beam splitter is adapted to produce a transmitted light beam and at least one pair of diffracted light beams which are substantially symmetrical with relation to said transmitted light beam and wherein said means to detect interference frequencies is arranged in one of said pair of diffracted light beams beyond said point of convergence and a second means to detect interferences frequencies is arranged in the axis of the other of said pair of diffracted light beams before said point of convergence and the outputs of said means to detect are led to the inputs of a differential amplifier.

3. An apparatus according to claim 1, wherein multiple holographic beam splitter comprises a plurality of multiple holograms mounted in a circular fashion and rotatable about its center, which on revolution causes a frequency shift in the frequency of a diffracted light beam.

4. An apparatus according to claim 1, designed to determine at least three spatial components of the velocity of the effluvium, wherein the hologram is at least threefold and interference detectors are present in the axes of at least three light beams that intersect the optical axis of the apparatus in the point of measurement.

* * * * *